(12) United States Patent
Lee et al.

(10) Patent No.: US 8,595,578 B1
(45) Date of Patent: Nov. 26, 2013

(54) SIGNIFICANCE OF RETRANSMISSION USED IN SUBSEQUENT DECODING

(75) Inventors: Jungwon Lee, San Diego, CA (US); Jiwoong Choi, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 482 days.

(21) Appl. No.: 12/940,784

(22) Filed: Nov. 5, 2010

Related U.S. Application Data

(60) Provisional application No. 61/258,769, filed on Nov. 6, 2009.

(51) Int. Cl.
*H04L 1/18* (2006.01)
(52) U.S. Cl.
USPC .......................................... 714/748; 714/751
(58) Field of Classification Search
None
See application file for complete search history.

(56) References Cited

U.S. PATENT DOCUMENTS

| | | | | |
|---|---|---|---|---|
| 5,983,382 | A * | 11/1999 | Pauls | 714/744 |
| 8,286,048 | B1 * | 10/2012 | Chen et al. | 714/752 |
| 2002/0199147 | A1 * | 12/2002 | Kim et al. | 714/748 |
| 2004/0192308 | A1 * | 9/2004 | Lee et al. | 455/436 |
| 2005/0007948 | A1 * | 1/2005 | Wan et al. | 370/208 |
| 2008/0276147 | A1 * | 11/2008 | Gho et al. | 714/748 |
| 2009/0158109 | A1 * | 6/2009 | Park et al. | 714/748 |
| 2009/0307559 | A1 * | 12/2009 | Wu et al. | 714/749 |
| 2011/0154143 | A1 * | 6/2011 | Eckert | 714/748 |
| 2011/0197103 | A1 * | 8/2011 | Cho et al. | 714/751 |

* cited by examiner

*Primary Examiner* — Gabriel Chu

(57) ABSTRACT

Systems and techniques relating to wireless communications are described. A described technique includes receiving signals representing wireless data transmissions that are based on a symbol, the received signals including one or more first signals and a second signal, where a decoded version of the one or more first signals previously failed to successfully resolve the symbol. The second signal can be transmitted in response to the one or more first signals failing to successfully resolve the symbol. The technique includes determining the symbol based on the received signals, where the determining places more significance to the second signal than the one or more first signals.

23 Claims, 6 Drawing Sheets

Receiving signals representing wireless data transmissions that are based on a symbol (e.g., one or more first signals that have failed to successfully resolve the symbol and a second signal) ⎯ 605

Determining the symbol based on the received signals by placing more significance to the second signal than the one or more first signals ⎯ 610

SIGNIFICANCE OF RETRANSMISSION USED IN SUBSEQUENT DECODING

CROSS REFERENCE TO RELATED APPLICATION

This disclosure claims the benefit of the priority of U.S. Provisional Application Ser. No. 61/258,769, filed Nov. 6, 2009 and entitled "IMPROVED HARQ SCHEME EXPLOITING CRC CHECK INFORMATION," which is incorporated herein by reference in its entirety.

BACKGROUND

This disclosure relates to wireless communications.

Wireless communication devices can use one or more wireless communication technologies such as orthogonal frequency division multiplexing (OFDM) or code division multiple access (CDMA). In an OFDM based wireless communication system, a data stream is split into multiple data substreams. Such data substreams are sent over different OFDM subcarriers, which can be referred to as tones or frequency tones. Various examples of wireless communication devices include mobile phones, smart phones, wireless routers, wireless hubs, base stations, and access points. In some cases, wireless communication electronics are integrated with data processing equipment such as laptops, personal digital assistants, and computers.

Wireless communication systems provide mechanisms for data retransmission such as automatic repeat request (ARQ) and hybrid ARQ (HARQ). In ARQ, error detection (ED) information bits, e.g., cyclic redundancy check (CRC) bits or checksum bits, are included in a data transmission. A wireless communication device can use error detection bits to detect one or more errors in a decoded version of a received message. In HARQ, error correction bits such as forward error correction (FEC) bits are included in a data transmission. A wireless communication device can use error correction bits to correct one or more errors in a decoded version of a received message. A data transmission can include FEC bits and error detection bits. In some implementations, FEC bits provide error detection capabilities. A wireless communication device can use a coding technique such as Reed-Solomon coding, convolutional coding, or turbo coding to encode and decode data. Encoding data may compensate for noise on a wireless communication channel.

SUMMARY

The present disclosure includes systems and techniques for wireless communications.

According to an aspect of the present disclosure, a technique for wireless communications includes receiving signals representing wireless data transmissions that are based on a symbol, the received signals including one or more first signals and a second signal, where a decoded version of the one or more first signals previously failed to successfully resolve the symbol. The second signal can be transmitted in response to the one or more first signals failing to successfully resolve the symbol. The technique includes determining the symbol based on the received signals, where the determining places more significance to the second signal than the one or more first signals The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses can include circuitry configured to receive signals representing wireless data transmissions that are based on a symbol. The received signals can include one or more first signals and a second signal, where a decoded version of the one or more first signals previously failed to successfully resolve the symbol, and where the second signal was transmitted in response to the one or more first signals failing to successfully resolve the symbol. Implementations can include circuitry such as processor electronics configured to perform operations that include determining the symbol based on the received signals, where the determining places more significance to the second signal than the one or more first signals.

In another aspect, systems and apparatuses can include circuitry configured to store information indicative of receive signals representing wireless data transmissions that are based on/a symbol. The received signals can include one or more first signals and a second signal, where a decoded version of the one or more first signals previously failed to successfully resolve the symbol, and where the second signal was transmitted in response to the one or more first signals failing to successfully resolve the symbol. Implementations can include processor circuitry configured to determine the symbol based on the received signals by placing more significance to the second signal than the one or more first signals.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

A wireless communication device can use error detection information in a decoding process to resolve a message in a retransmission scenario. A wireless communication device can generate error detection information based on checking a decoded message's error detection bits such as cyclic redundancy check (CRC) bits with error detection bits that are generated based on a body of the decoded message. The error detection information can indicate a success or a failure. A decoded message that fails error detection is deemed to have failed decoding, whereas a decoded message that passes error detection is deemed to have been successfully decoded. The wireless communication device can use error detection information to select between sending an acknowledgement (ACK) or a negative acknowledgement (NACK) to the device that transmitted the message.

A decoding process can use information associated with a current block associated with a message (e.g., a current received signal) and information associated with one or more previous blocks associated with the message (e.g., previous received signal) to resolve the message. The terms "current" and "previous" are used on a relative basis to indicate that one or more previous blocks have arrived before the current block. A message can include one or more symbols. Here, the previous block(s) failed error detection and, accordingly, triggered one or more retransmissions. The current block has an unknown error detection status before decoding, e.g., the current block may or may not decode successfully. The current block may have experienced a better channel condition than the previous blocks. Thus, the current block may have a better chance at decoding the symbol than the previous blocks. Accordingly, a decoding process can place more weight on the current block than the previous blocks. For example, a decoding process can combine current and previous blocks to resolve a message by assigning a greater weight value to the current block than the previous blocks. If decoding fails based on the weighted combination, then the current block can be treated the same as the previous blocks when processing a future retransmission. In another example, a decoding process can decode a current block without using the previous blocks. Based on a failure, the decoding process can combine the current block with the previous blocks based on a uniform combination.

Figure 1:
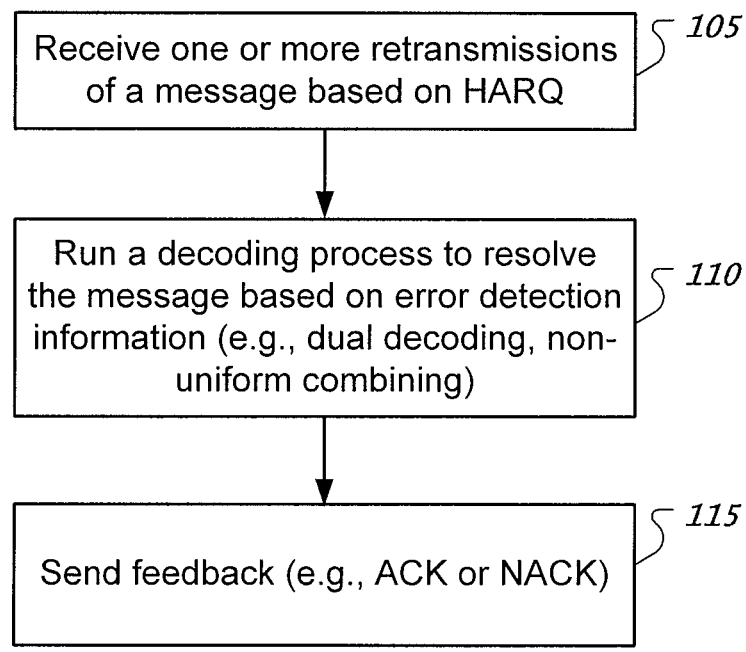
FIG. 1 shows an example of a communication process that uses error detection information for decoding one or more received signals based on hybrid automatic repeat request.

FIG. 1 shows an example of a communication process that uses error detection information for decoding one or more received signals based on hybrid automatic repeat request. A wireless communication device can run a communication process that uses HARQ for retransmission. The wireless communication device can be configured for one or more wireless communication techniques such as single-input single-output (SISO), multi-input multi-output (MIMO), bit-level combining, and symbol-level combining. At 105, the communication process receives one or more retransmissions of a message based on a HARQ technique. Various examples of HARQ techniques include chase combining (CC-HARQ) and incremental redundancy (IR-HARQ). At 110, the communication process runs a decoding process to resolve the message based on error detection information (e.g., dual decoding, non-uniform combining). At 115, the communication process sends feedback such as an ACK or NACK based on an outcome of the decoding.

For non-uniform combining, a decoding process, at 110, can place more weight on the current received signal than one or more previously received signals to combine signals for decoding. For dual decoding, a decoding process, at 110, can perform a primary decoding by decoding a current received signal without using the one or more previously received signals. Based on a failure indicated by error detection information, the decoding process can perform a secondary decoding by combining the current received signal with the one or more previously received signals.

Figure 2:
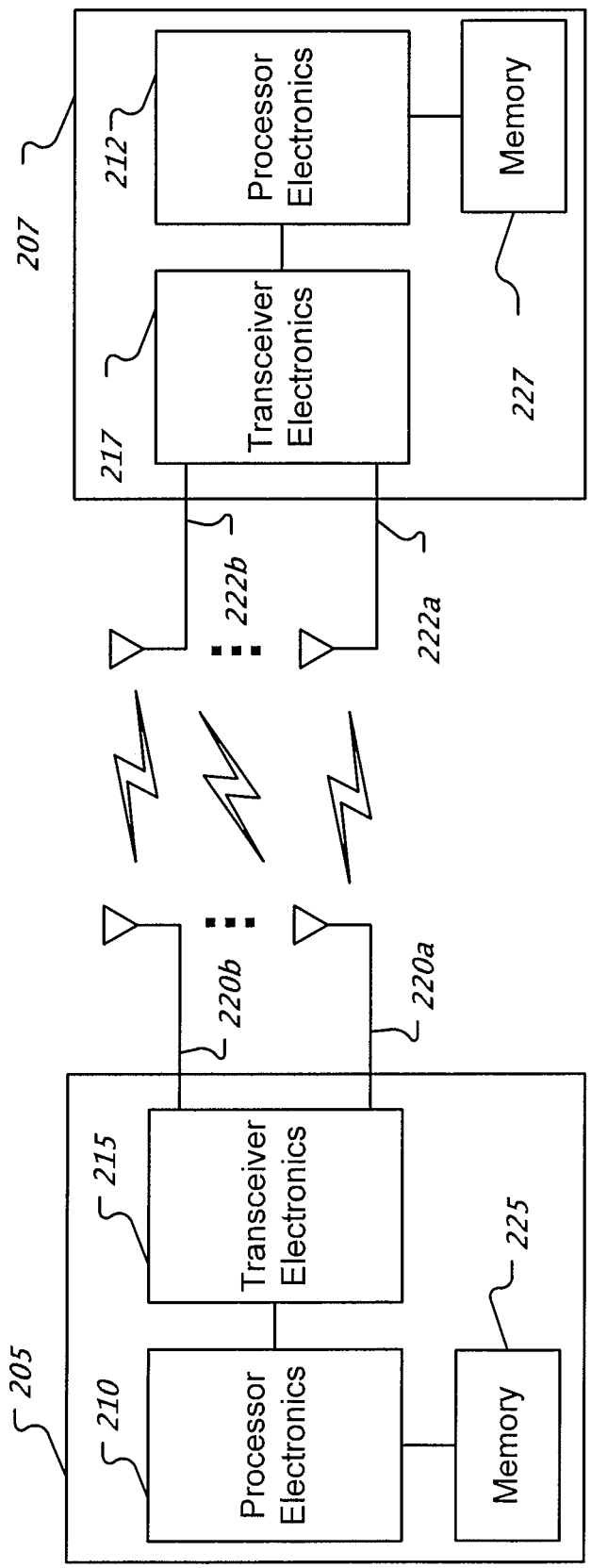
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a, 220b, 222a, 222b. In some implementations, transceiver electronics 215, 217 include integrated transmitting and receiving circuitry. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. Transceiver electronics 615, 617 can include one or more of: detector, decoder, modulator, and encoder. Transceiver electronics 615, 617 can include one or more analog circuits.

Wireless communication devices can run one or more HARQ techniques. In a HARQ technique such as a CC-HARQ technique or an IR-HARQ technique, a wireless communication device can decode a signal using a received block and one or more previously received blocks. If decoding fails, the device can send a negative acknowledgement to trigger a retransmission.

In CC-HARQ, every retransmission contains the same information, e.g., same data and same parity bits. For example, a wireless communication device retransmits the same version of the symbol x. A received signal can be represented by $$y_i = H_i x + n_i, i = 1, \ldots, N$$

where N is the number of received signal vectors, $y_i$ is a received channel output with dimensions $N_r \times 1$, $H_i$ is a channel matrix with dimensions $N_r \times N_t$, $n_i$ is an additive white Gaussian noise (AWGN), and x is a common channel input, e.g., a symbol, that is repeatedly transmitted. The values $N_r$ and $N_t$ represent the number of receive and transmit antennas, respectively. The probability density function (PDF) for CC-HARQ is given by:

$$Pr\{y_i \mid x, H_i\} = \frac{1}{\pi N_r} \exp\{-\|y_i - H_i x\|^2\}.$$

A wireless communication device can perform maximum likelihood estimation using the PDF to determine x.

In IR-HARQ, each retransmission contains different information than the previous one. A received signal can be represented by $$y_i = H_i x_i + n_i, i = 1, \ldots, N$$

where different $x_i$ possible. In some cases, different types of error detection bits can be added in consecutive retransmissions. For example, each $x_i$ include different systematic or parity bits that are encoded using a different code.

A HARQ based receiving process can use a maximum likelihood (ML) estimator to determine x. The estimator can compute a log-likelihood ratio (LLR) for a bit index λ, where the index corresponds to a bit in an uncoded message. The estimator considers all combinations of transmitted signals that include bit λ with value 0 or value 1. The estimator can compute a LLR based on:

$$LLR(\lambda) = \ln \frac{\sum_{(x_1,x_2,\ldots,x_N) \in X_{(\lambda)}^{(1)}} Pr\{y_1, y_2, \ldots, y_N | x_1, x_2, \ldots, x_N, h_1, h_2, \ldots, h_N\}}{\sum_{(x_1,x_2,\ldots,x_N) \in X_{(\lambda)}^{(0)}} Pr\{y_1, y_2, \ldots, y_N | x_1, x_2, \ldots, x_N, h_1, h_2, \ldots, h_N\}}$$

where $X_\lambda^{(0)}$ represents the combinations of transmitted signals that include bit λ with value 0, and $X_\lambda^{(1)}$ represents the combinations of transmitted signals that include bit λ with value 1.

In cases where the same symbol x is transmitted, e.g., CC-HARQ, the LLR is represented by:

$$LLR(\lambda) = \ln \frac{\sum_{x \in X_{(\lambda)}^{(1)}} Pr\{y_1, y_2, \ldots, y_N | x, h_1, h_2, \ldots, h_N\}}{\sum_{x \in X_{(\lambda)}^{(0)}} Pr\{y_1, y_2, \ldots, y_N | x, h_1, h_2, \ldots, h_N\}}.$$

A wireless communication device can perform CC-HARQ based soft decoding. Such soft decoding can include computing, via a distance-level combining, a LLR based on multiple received versions of a transmitted symbol. Here, a LLR value is given by:

$$LLR(\lambda) = \ln \frac{\sum_{x \in X_{(\lambda)}^{(1)}} \exp\left\{-\sum_{i=1}^{N} \|y_i - h_i x\|^2 / \sigma_n^2\right\}}{\sum_{x \in X_{(\lambda)}^{(0)}} \exp\left\{-\sum_{i=1}^{N} \|y_i - h_i x\|^2 / \sigma_n^2\right\}}$$

where $\sigma_n^2$ represents a noise variance. For each retransmission, e.g., N-th transmission after (N−1) failures, received symbols $y_i$ (i=1, 2, . . . , N) are equally combined for a LLR computation to determine a LLR value. A soft channel decoder can use the combined signals. The decoder can compute:

$$\sum_{i=1}^{N} \|y_i - h_i x\|^2 / \sigma_n^2$$

to determine x.

A wireless communication device can perform IR-HARQ based soft decoding where bit information at λ may or may not exist in each transmission. Such soft decoding can include computing, via a distance-level combining, a LLR based on multiple received versions of a transmitted symbol. Here, a LLR value is given by:

$$LLR(\lambda) = \ln \frac{\sum_{x \in X_{(\lambda)}^{(1)}} \exp\left\{-\sum_{i=1}^{N} \alpha_i(\lambda)\|y_i - h_i x\|^2 / \sigma_n^2\right\}}{\sum_{x \in X_{(\lambda)}^{(0)}} \exp\left\{-\sum_{i=1}^{N} \alpha_i(\lambda)\|y_i - h_i x\|^2 / \sigma_n^2\right\}}$$

where $\alpha_i(\lambda)$ equals one if there is information for the λ information bit at the i-th transmission, and equals zero otherwise.

A wireless communication device can perform hard decoding to determine a symbol. Instead of performing a LLR computation, hard decoding can use a combined output that is sent to a channel slicer and then to a channel decoder for maximal ratio combining (MRC). For CC-HARQ, the decoded symbol is given by:

$$\hat{x} = \frac{\sum_{i=1}^{N} h_i^* y_i}{\sum_{i=1}^{N} \|h_i\|^2}.$$

For IR-HARQ, the decoded symbol is given by:

$$\hat{x} = \frac{\sum_{i=1}^{N} \alpha_i(\lambda) h_i^* y_i}{\sum_{i=1}^{N} \alpha_i(\lambda) \|h_i\|^2}.$$

In a dual decoding technique, a wireless communication device can perform primary decoding and selective secondary decoding of received signals. For example, a device can decode a version of a transmitted symbol using a current receive signal. Based on a decoding failure, the device can decode a version of the symbol using the current and one or more previous received signals. The device can transmit a negative acknowledgement based on a failure outcome of the secondary decoding.

Figure 3:
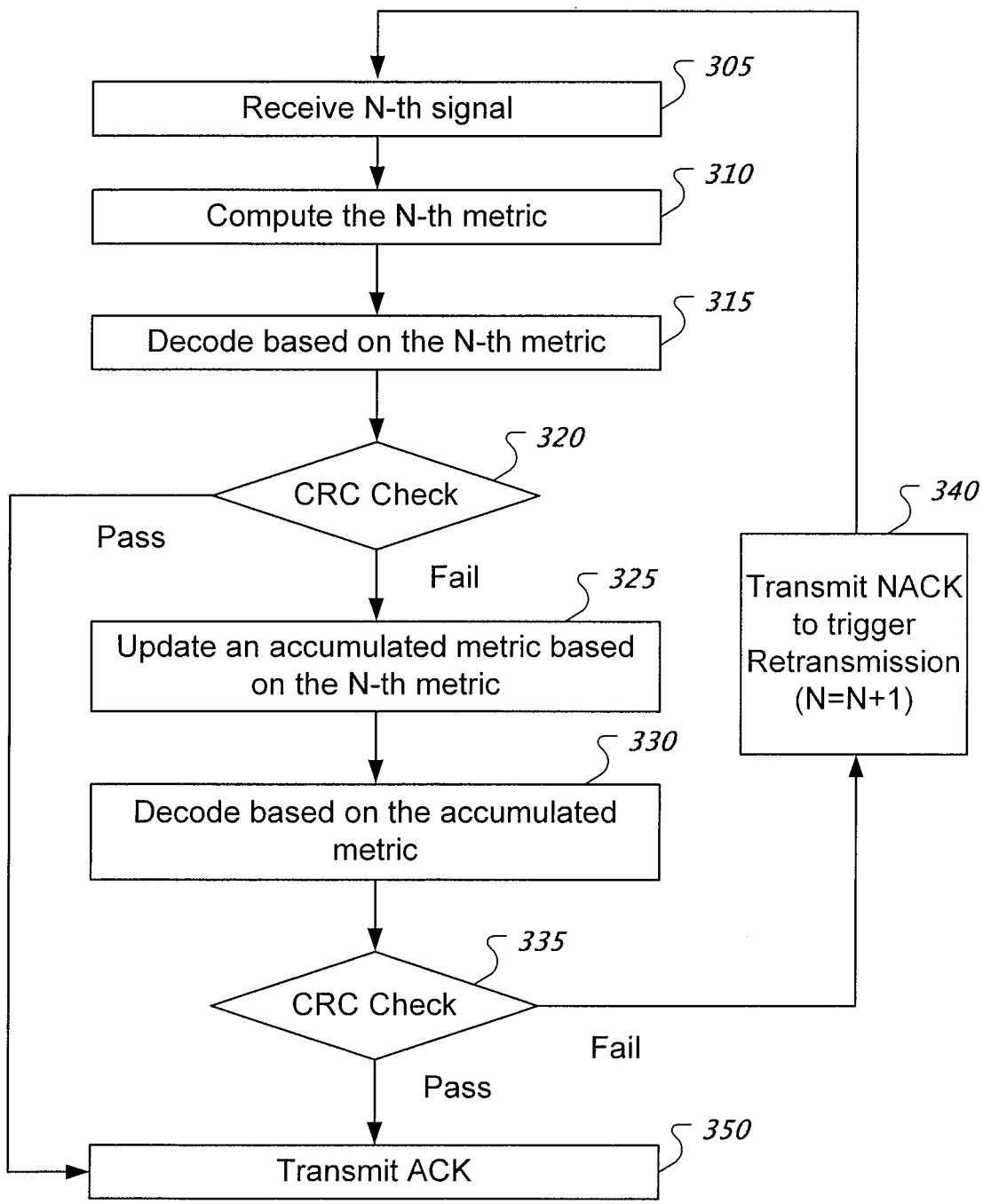
FIG. 3 shows an example of a decoding process based on dual decoding of a received signal.

FIG. 3 shows an example of a decoding process based on dual decoding of a received signal. At 305, a decoding process receives the N-th signal. The N-th signal is referred to as the current signal. At 310, the process computes the N-th metric. In some implementations, computing the N-th metric includes computing:

$$M_N = \|y_N - h_N x\|^2$$

where $M_N$ is the metric for the N-th signal. At 315, the process decodes based on the N-th metric. For example, the process decodes using the current received signal but not the previous signal(s). In some implementations, decoding includes performing soft decoding. In some implementations, decoding includes performing hard decoding. At 320, the process performs a CRC check. Other error detection techniques are possible. Passing CRC, the process, at 350, causes a transmission of an ACK.

Failing CRC, the decoding process, at 325, updates an accumulated metric based on the N-th metric. In some implementations, computing an accumulated metric includes computing:

$$AM_N = AM_{N-1} + M_N$$

where $AM_N$ represents the accumulated metric updated with the N-th metric. At 330, the process decodes based on the accumulated metric. Decoding based on the accumulated metric can include performing soft decoding. In some implementations, decoding based on the accumulated metric includes computing one or more LLR values. Decoding based on the accumulated metric can include performing hard decoding. At 335, the process performs a CRC check. Passing CRC, the process, at 350, causes a transmission of an ACK. Failing CRC, the decoding process, at 340, causes a transmission of a NACK to trigger a retransmission. At 305, the decoding process receives the retransmission as the N-th signal and repeats the above operations.

Figure 4:
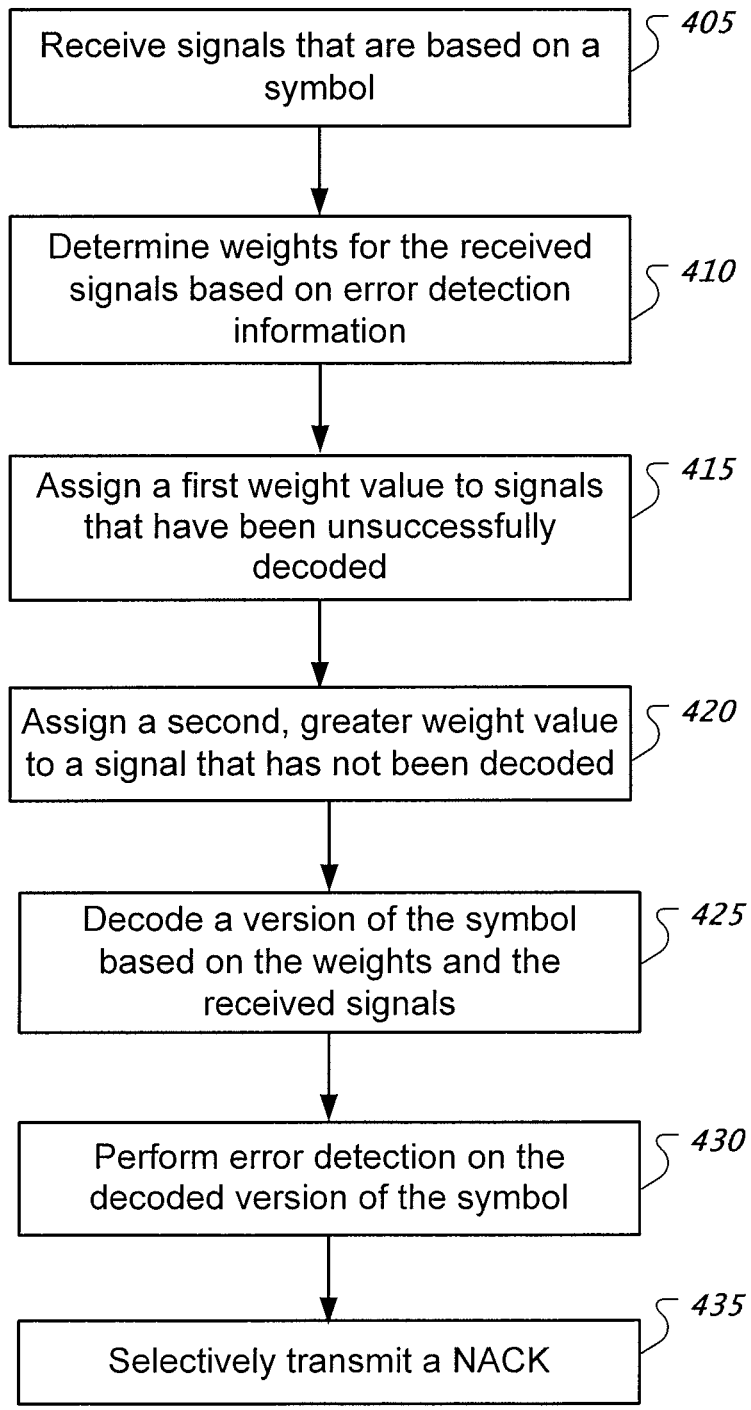
FIG. 4 shows an example of a decoding process based on non-uniform combining of received signals.

FIG. 4 shows an example of a decoding process based on non-uniform combining of received signals. At 405, a decoding process includes receiving signals that are based on a symbol. Received signals include a signal based on an original transmitted version of the symbol, and one or more signals that are based on retransmitted versions of the symbol. In some implementations, the retransmitted versions are different than the original transmitted version.

At 410, the decoding process includes determining weights for the received signals based on error detection information, such as error detection information associated with previous signals. Determining weights for the received signals can include calculating a noise variance. Determining weights for the received signals can include calculating a modified version of a noise variance.

At 415, the decoding process includes assigning a first weight value to one or more signal that have been unsuccessfully decoded. At 420, the decoding process includes assigning a second, greater weight value to a signal that has not been decoded. Determining weights for the received signals can include assigning the weights. In some implementations, the first weight is based on the second weight and a code word minimum distance parameter.

At 425, the decoding process includes decoding a version of the symbol based on the weights and the received signals. Decoding a version of the symbol can include performing one of CC-HARQ soft decoding, IR-HARQ soft decoding, CC-HARQ hard decoding, and IR-HARQ hard decoding. At 430, the decoding process includes performing error detection on the decoded version of the symbol. Performing error detection can include computing a CRC and comparing the computed CRC with a decoded version. At 435, the decoding process includes selectively transmitting a NACK to trigger a retransmission based on the symbol.

In non-uniform combining of received signals, a wireless communication device can treat the received versions of the original transmitted and retransmitted versions of a symbol differently. For example, the wireless communication device can non-uniformly combine the received versions to decode the symbol x. Each received version can be assigned a weight A for combining. The current received version (e.g., the N-th block) is not yet decoded, whereas the previous versions were decoded unsuccessfully. The weight assigned to the current received version is larger than the other weights: $\beta_N \geq \beta_1, \ldots, \beta_{N-1}$. Decoding techniques such as CC-HARQ soft decoding, IR-HARQ soft decoding, CC-HARQ hard decoding, and IR-HARQ hard decoding can use these weight $\beta_i$ to control combing of received versions.

For CC-HARQ soft decoding, the symbol x can be estimated based on $$\hat{x} = \frac{\sum_{i=1}^{N} \beta_i \|y_i - h_i x\|^2}{\sum_{i=1}^{N} \beta_i}.$$

For IR-HARQ soft decoding, the symbol x can be estimated based on $$\hat{x} = \frac{\sum_{i=1}^{N} \alpha_i(\lambda) \beta_i \|y_i - h_i x\|^2}{\sum_{i=1}^{N} \alpha_i(\lambda) \beta_i}.$$

For CC-HARQ hard decoding, the symbol x can be estimated based on $$\hat{x} = \frac{\sum_{i=1}^{N} \beta_i h_i^* y_i}{\sum_{i=1}^{N} \beta_i \|h_i\|^2}.$$

For IR-HARQ hard decoding, the symbol x can be estimated based on $$\hat{x} = \frac{\sum_{i=1}^{N} \alpha_i(\lambda) \beta_i h_i^* y_i}{\sum_{i=1}^{N} \alpha_i(\lambda) \beta_i \|h_i\|^2}.$$

Decoding that results in a failure can indicate that the magnitude of a realized noise vector is larger than half the value of a code word minimum distance parameter $d_{min}$. The parameter represents a minimum distance between any two code words associated with a point constellation, e.g., a quadrature amplitude modulation (QAM) point constellation. In response to a failure, a wireless communication device can change a noise vector PDF used in a decoding process. For example, the device that uses the following PDF:

$$f(z) = \frac{1}{\sqrt{2\pi}\,\sigma_n} \exp\left(-\frac{z^2}{2\sigma_n^2}\right)$$

can switch, based on a decoding failure, to a modified PDF:

$$\tilde{f}(z) = \begin{cases} \dfrac{f(z)}{2 \int_{d_{min}}^{\infty} f(z)\,dz}, & |z| > d_{min}/2 \\ 0, & |z| \leq d_{min}/2 \end{cases}$$

for processing received signals that are based on the same symbol.

A wireless communication device can approximate a modified noise vector PDF as a Gaussian random vector with a covariance matrix (e.g., $\sigma_{new}^2 I$). In some implementations, a wireless communication device can determine a modified noise variance $\sigma_{new}^2$ by setting a noise variance based on $(d_{min}/2)^2$ if the original noise variance $\sigma_n^2$ was less than $(d_{min}/2)^2$. For example, a wireless communication device can determine a modified noise variance based on $$\sigma_{new}^2 = \frac{1}{L}\max\{L\sigma_n^2, c(d_{min}/2)^2\}$$

where L is a code length, and c is a constant, which can be one. In some implementations, a wireless communication device can determine a modified noise variance $\sigma_{new}^2$ by setting a noise variance as the true noise power based on a decoding failure:

$$\sigma_{new}^2 = \sigma_n^2 + \frac{d_{min}\sigma_n}{2\sqrt{2\pi}\,Q(d_{min}/2\sigma_n)}\exp\left(-\frac{d_{min}^2}{8\sigma_n^2}\right)$$

where $$Q(x) = \int_x^\infty \exp(-x^2/2)\,dx.$$

The wireless communication device can use the modified noise variance for the calculation of weights for the received signals:

$$\beta_i = \begin{cases} (\sigma_n^2)^{-1}, & i = N \\ (\sigma_{new}^2)^{-1}, & i < N \end{cases}$$

where the weights that are based on the modified noise variance $\sigma_{new}^2$ are assigned to the previously received signals (e.g., i<N) and the weight that is based on the original noise variance $\sigma_n^2$ is assigned to the current received signal (e.g., i=N). Note that the relationship $(\sigma_n^2)^{-1} > (\sigma_{new}^2)^{-1}$ holds.

A wireless communication device can use an accumulated metric to decode received signals. An accumulated metric can track contributions from previously received signals. A received signal can be assigned a weight for combining and a different weight for updating an accumulated metric. For the N-th received signal, the symbol x can be estimated based on $$\hat{x}_N = T_{N-1} + \frac{\|y_N - h_N x\|^2}{\sigma_n^2},$$

where $T_{N-1}$ represents an accumulated metric. If the N-th received signal fails decoding, the accumulated metric can be updated based on the N-th received signal. Updating an accumulated metric can include computing:

$$T_N = T_{N-1} + \frac{\|y_N - h_N x\|^2}{\sigma_{new}^2}$$

and storing $T_N$ as the accumulated metric for the (N+1)-th received signal. Alternatively, updating an accumulated metric can include computing:

$$T_n = \sum_{i=1}^n \frac{\|y_i - h_i x\|^2}{\sigma_{new}^2}.$$

A wireless communication device can store $T_n$ in a memory for future use.

Figure 5:
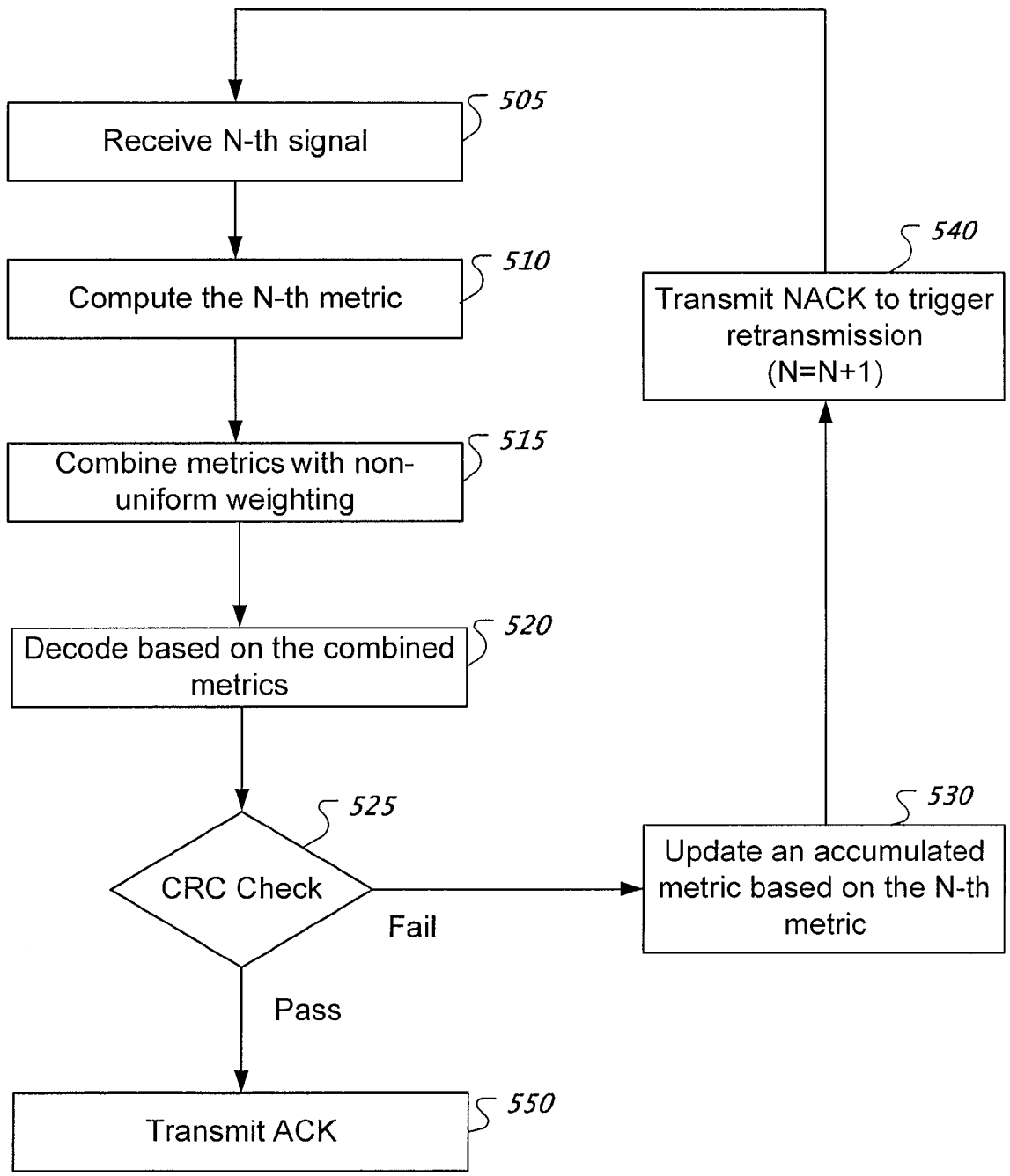
FIG. 5 shows another example of a decoding process based on non-uniform combining of received signals.

FIG. 5 shows another example of a decoding process based on non-uniform combining of received signals. At 505, a decoding process receives the N-th signal. The N-th signal is referred to as the current signal. At 510, the process computes the N-th metric. In some implementations, computing the N-th metric includes computing:

$$M_N = \|y_N - h_N x\|^2$$

where $M_N$ is the metric for the N-th signal. At 515, the process combines metrics with non-uniform weighting. Combining metrics with non-uniform weighting can include multiplying a first weight value and $M_N$, and multiplying a second, lesser weight value and one or more previously computed metrics $M_i$ for i<N.

At 520, the process decodes based on the combined metrics. In some implementations, decoding includes performing soft decoding. In some implementations, decoding includes performing hard decoding. At 525, the process performs a CRC check. Passing CRC, the process, at 550, causes a transmission of an ACK.

Failing CRC, the decoding process, at 530, updates an accumulated metric based on the N-th metric. At 540, the decoding process causes a transmission of a NACK to trigger a retransmission. At 505, the decoding process receives the retransmission as the N-th signal and repeats the above operations.

Figure 6:
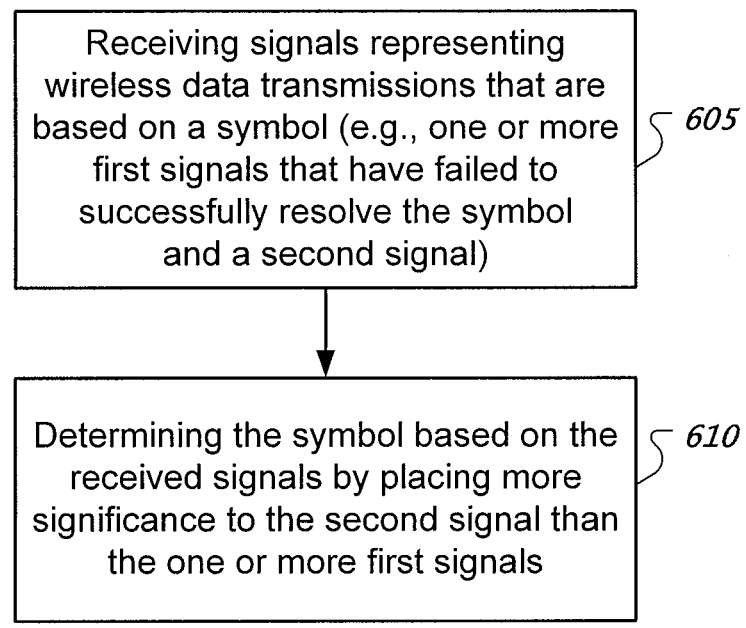
FIG. 6 shows an example of a communication process that uses error detection information.

FIG. 6 shows an example of a communication process that uses error detection information. At 605, the process includes receiving signals representing wireless data transmissions that are based on a symbol. The received signals can include one or more first signals that have failed to successfully resolve the symbol and a second signal. The second signal is received after the one or more first signals. The second signal can be transmitted in response to the one or more first signals failing to successfully resolve the symbol. At 610, the process includes determining the symbol based on the received signals by placing more significance to the second signal than the one or more first signals. In some implementations, placing more significance to the second signal includes decoding a symbol based on the second signal and, if that fails, decoding a symbol based on a combination of the second signal and the one or more first signals. In some implementations, placing more significance to the second signal includes performing a non-uniform combination of the second signal and the one or more first signals.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
    receiving, at a wireless communication device, signals representing wireless data transmissions that are based on a symbol, the received signals including one or more first signals and a second signal, wherein a decoded first version of the symbol that is based on the one or more first signals previously failed to successfully resolve the symbol, and wherein the second signal was transmitted in response to the one or more first signals failing to successfully resolve the symbol;
    determining a metric based on the second signal;
    updating an accumulated metric based on the determined metric; and
    determining the symbol based on the received signals, wherein determining the symbol places more significance to the second signal than the one or more first signals, wherein determining the symbol comprises decoding a second version of the symbol based on the received signals, and wherein decoding the second version of the symbol comprises using a version of the accumulated metric.

2. The method of claim 1, wherein determining the symbol comprises
    decoding the second version of the symbol based on the received signals and respective assigned weights, the weights include a first weight value assigned to the one or more first signals and a second, greater weight value assigned to the second signal; and
    performing error detection on the decoded second version of the symbol.

3. The method of claim 2, further comprising:
    determining the second weight based on a noise variance; and
    determining the first weight based on a modified version of the noise variance.

4. The method of claim 2, further comprising:
    determining the first weight based on i) the second weight and ii) a code word minimum distance parameter.

5. The method of claim 2, further comprising:
    determining that the decoded second version of the symbol fails to successfully resolve the symbol; and
    transmitting a negative acknowledgement to trigger a retransmission of the symbol.

6. The method of claim 1, wherein determining the symbol comprises
    first decoding a version of the symbol using the second signal; and
    selectively second decoding, in response to an outcome of the first decoding, a version of the symbol using the one or more first signals and the second signal.

7. The method of claim 6, further comprising:
    transmitting, in response to a failure outcome of the second decoding, a negative acknowledgement.

8. The method of claim 1, wherein the received signals include a signal based on an original transmitted version of the symbol, and wherein receiving signals comprises receiving one or more retransmitted versions of the symbol that are different from the original transmitted version of the symbol.

9. A system comprising:
    circuitry configured to receive signals representing wireless data transmissions that are based on a symbol, the received signals including one or more first signals and a second signal, wherein a decoded first version of the symbol that is based on the one or more first signals previously failed to successfully resolve the symbol, and wherein the second signal was transmitted in response to the one or more first signals failing to successfully resolve the symbol; and
    processor electronics configured to perform operations comprising i) determining a metric based on the second signal, ii) updating an accumulated metric based on the determined metric, and iii) determining the symbol based on the received signals, wherein determining the symbol places more significance to the second signal than the one or more first signals, wherein determining the symbol comprises decoding a second version of the symbol based on the received signals, and wherein decoding the second version of the symbol comprises using a version of the accumulated metric.

10. The system of claim 9, wherein determining the symbol comprises
- decoding the second version of the symbol based on the received signals and respective assigned weights, the weights include a first weight value assigned to the one or more first signals and a second, greater weight value assigned to the second signal; and
- performing error detection on the decoded second version of the symbol.

11. The system of claim 10, the operations further comprising:
- determining the second weight based on a noise variance; and
- determining the first weight based on a modified version of the noise variance.

12. The system of claim 10, the operations further comprising:
- determining the first weight based on i) the second weight and ii) a code word minimum distance parameter.

13. The system of claim 10, further comprising:
- circuitry to transmit signals, wherein the operations further comprise i) determining that the decoded version of the symbol fails to successfully resolve the symbol, and ii) controlling the circuitry to transmit signals to transmit a negative acknowledgement to trigger a retransmission of the symbol.

14. The system of claim 9, wherein determining the symbol comprises:
- first decoding a version of the symbol using the second signal; and
- selectively second decoding, in response to an outcome of the first decoding, a version of the symbol using the one or more first signals and the second signal.

15. The system of claim 14, further comprising:
- circuitry to transmit signals, wherein the operations further comprise controlling, in response to a failure outcome of the second decoding, the circuitry to transmit signals to transmit a negative acknowledgement.

16. The system of claim 9, wherein the received signals include a signal based on an original transmitted version of the symbol, and wherein the received signals include one or more retransmitted versions of the symbol that are different from the original transmitted version of the symbol.

17. An apparatus comprising:
- circuitry configured to store information indicative of receive signals representing wireless data transmissions that are based on a symbol, the received signals including one or more first signals and a second signal, wherein a decoded version of the one or more first signals previously failed to successfully resolve the symbol, and wherein the second signal was transmitted in response to the one or more first signals failing to successfully resolve the symbol; and
- processor circuitry configured to determine the symbol based on the received signals by placing more significance to the second signal than the one or more first signals,
- wherein the processor circuitry is configured to decode a version of the symbol based on the received signals and respective assigned weights, the weights include a first weight value assigned to the one or more first signals and a second weight value assigned to the second signal, and
- wherein the processor circuitry is configured to i) determine the second weight based on a noise variance, and ii) determine the first weight based on a modified version of the noise variance.

18. The apparatus of claim 17, wherein the processor circuitry is configured to perform error detection on the decoded version of the symbol, wherein the second weight value is greater than the first weight value.

19. The apparatus of claim 18, wherein the processor circuitry is configured to determine the first weight based on i) the second weight and ii) a code word minimum distance parameter.

20. The apparatus of claim 18, wherein the processor circuitry is configured to i) determine a metric based on the second signal, ii) determine that the decoded version of the symbol fails to successfully resolve the symbol, iii) update an accumulated metric based on the determined metric, and iv) control a transmission of a negative acknowledgement to trigger a retransmission of the symbol, wherein the decoded version of the symbol is based on a version of the accumulated metric.

21. The apparatus of claim 17, wherein the processor circuitry is configured to i) first decode a version of the symbol using the second signal, and ii) selectively second decode, in response to an outcome of the first decoding, a version of the symbol using the one or more first signals and the second signal.

22. The apparatus of claim 21, wherein the processor circuitry is configured to control, in response to a failure outcome of the second decoding, a transmission of a negative acknowledgement.

23. The apparatus of claim 17, wherein the received signals include a signal based on an original transmitted version of the symbol, and wherein the received signals include one or more retransmitted versions of the symbol that are different from the original transmitted version of the symbol.

* * * * *